(12) United States Patent
Matsuzawa et al.

(10) Patent No.: US 12,234,902 B2
(45) Date of Patent: Feb. 25, 2025

(54) STRAIN WAVE GEARING

(71) Applicant: HARMONIC DRIVE SYSTEMS INC., Tokyo (JP)

(72) Inventors: Kotaro Matsuzawa, Azumino (JP); Hideki Hirabayashi, Azumino (JP); Syuhei Kobayashi, Azumino (JP); Hideki Okuhara, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/264,942

(22) PCT Filed: May 26, 2021

(86) PCT No.: PCT/JP2021/020067
§ 371 (c)(1),
(2) Date: Aug. 10, 2023

(87) PCT Pub. No.: WO2022/249355
PCT Pub. Date: Dec. 1, 2022

(65) Prior Publication Data
US 2024/0052920 A1 Feb. 15, 2024

(51) Int. Cl.
*F16H 49/00* (2006.01)
*F16C 19/36* (2006.01)

(52) U.S. Cl.
CPC ......... *F16H 49/001* (2013.01); *F16C 19/362* (2013.01); *F16C 2226/62* (2013.01); *F16C 2361/61* (2013.01)

(58) Field of Classification Search
CPC .................................................. F16H 49/001
(Continued)

(56) References Cited

U.S. PATENT DOCUMENTS 5,906,142 A * 5/1999 Shirasawa ............. F16H 49/001
74/640
5,984,048 A * 11/1999 Kiyosawa ............. F16H 49/001
184/6.12
(Continued)

FOREIGN PATENT DOCUMENTS

JP H09250610 A 9/1997
JP H09291983 A 11/1997
(Continued)

OTHER PUBLICATIONS

International Search Report (PCT/ISA/210) with translation and Written Opinion (PCT/ISA/237) mailed on Aug. 3, 2021, by the Japan Patent Office as the International Searching Authority for International Application No. PCT/JP2021/020067. (8 pages).

*Primary Examiner* — Ha Dinh Ho
(74) *Attorney, Agent, or Firm* — Buchanan Ingersoll & Rooney PC

(57) ABSTRACT

A strain wave gearing includes an internally toothed gear integrated with an inner ring. A bolt hole is formed in the internally toothed gear. The bolt hole includes a bolt passage hole part, and a screw hole part extending in the direction of an axial line, continuously from the bolt passage hole part. The screw hole part, to which a bolt-fastening force is applied, is formed at a location away in the direction of the axial line from a location adjacent to a radially outer side of an internally toothed gear. Deformation, occurring during fastening of a bolt, at a portion in which the internally toothed gear is formed can be reduced, and adverse effects caused by the deformation such as a decrease in the accuracy of engagement or meshing of the internally toothed gear and an externally toothed gear can be inhibited.

1 Claim, 2 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 6,250,179 | B1* | 6/2001 | Shirasawa | F16H 49/001 |
| | | | | 74/640 |
| 7,165,473 | B2* | 1/2007 | Kobayashi | F16C 19/362 |
| | | | | 74/640 |
| 8,991,282 | B2* | 3/2015 | Yajima | F16H 49/001 |
| | | | | 74/640 |
| 10,132,398 | B2* | 11/2018 | Kobayashi | B23P 15/14 |
| 2002/0174545 | A1* | 11/2002 | Kiyosawa | F16C 33/64 |
| | | | | 29/898.063 |
| 2005/0217420 | A1 | 10/2005 | Kobayashi et al. | |
| 2015/0226302 | A1 | 8/2015 | Handa et al. | |

FOREIGN PATENT DOCUMENTS

| | | | |
|---|---|---|---|
| JP | 2005291237 A | 10/2005 | |
| WO | 2015001582 A1 | 1/2015 | |

\* cited by examiner

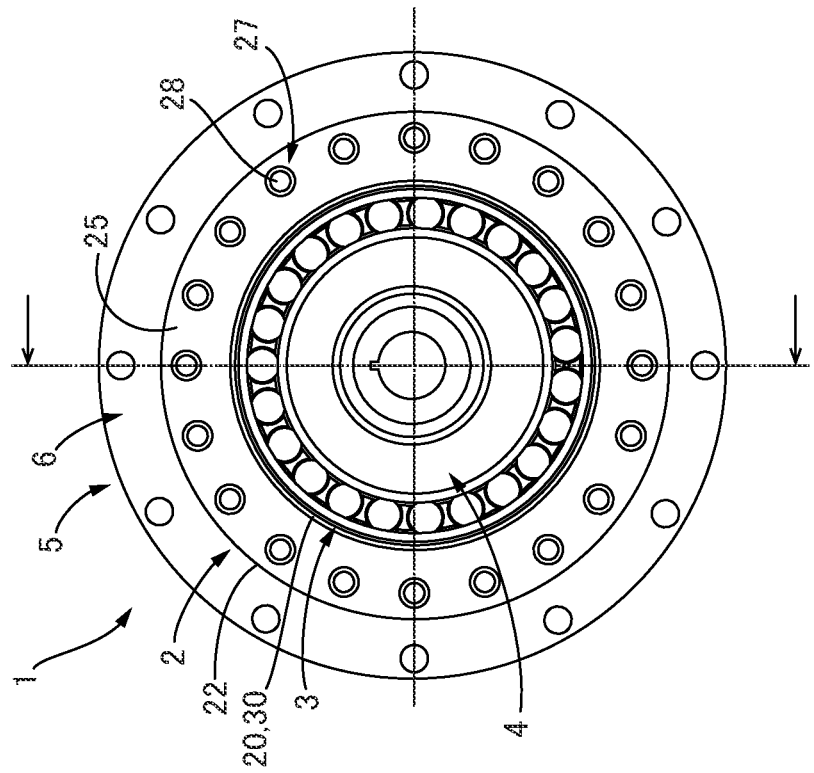
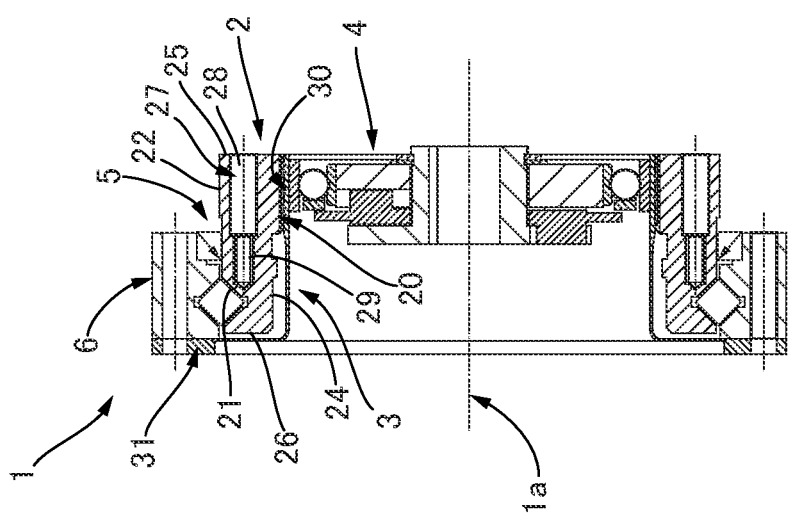

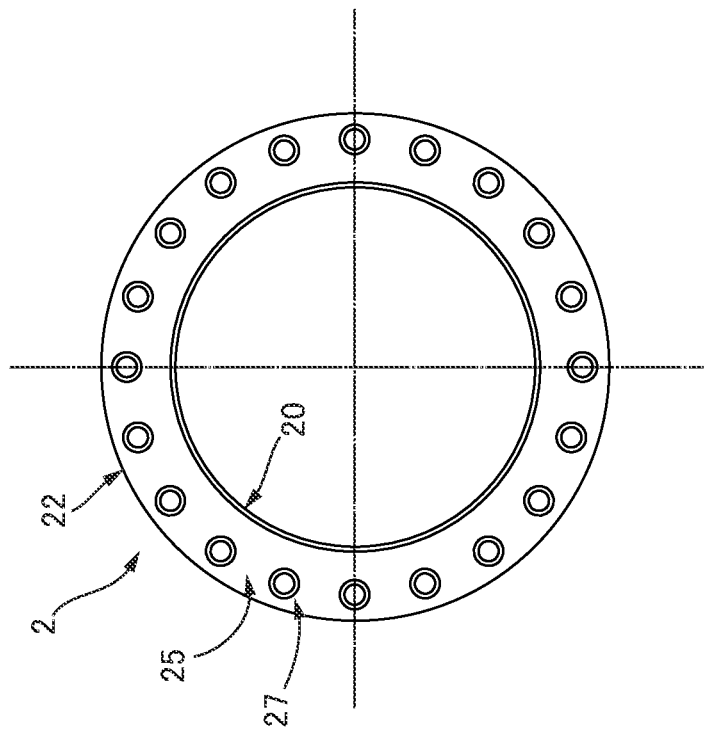
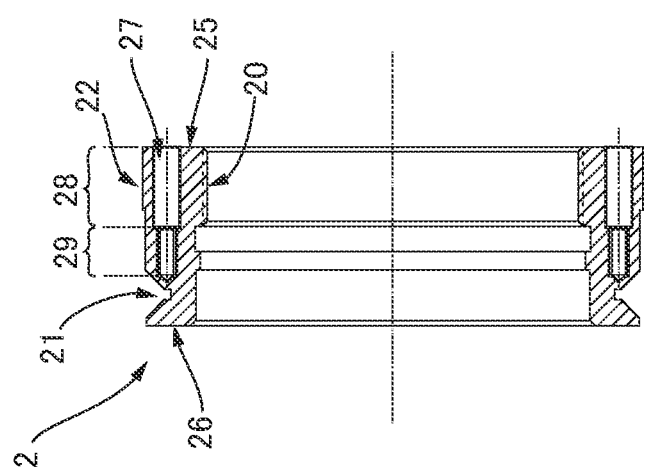

STRAIN WAVE GEARING

TECHNICAL FIELD

The present invention relates to a strain wave gearing in which a bearing supports a rigid internally toothed gear and a flexible externally toothed gear in a relatively rotatable state, and more particularly to a strain wave gearing provided with an inner-race integrated-type internally toothed gear in which a bearing has an inner race integrally formed on the internally toothed gear.

BACKGROUND ART

There is a case for a strain wave gearing provided with a bearing to employ an inner-race integrated-type internally toothed gear (in other words, an internally-toothed-gear integrated-type inner race) from the viewpoint of miniaturization, flattening, etc., thereof. Document 1 discloses a strain wave gearing provided with an inner-race integrated-type internally toothed gear.

An inner-race integrated-type internally toothed gear is formed with internal teeth on a circular inner circumferential surface thereof and is formed with an inner-race-side raceway groove of a bearing on a circular outer circumferential surface. The internally toothed gear is also formed with a screw hole opening on one annular end face thereof and is attached by a screw or bolt fastening to a fixed-side member (device housing) or an output member from which a reduced-speed rotation is outputted.

PRIOR ART DOCUMENTS

Patent Documents

Patent Document 1: JP 1997-291983 A

SUMMARY OF THE INVENTION

Problems to be Solved by the Invention

In an inner-race integrated-type internally toothed gear of a strain wave gearing, if a portion where a screw hole for attachment is located in the vicinity of a portion where internal teeth are formed, when the internally toothed gear is fastened by bolts (screws) to another member, the internal-tooth forming portion is subject to deformation, which causes to occur adverse effects such as deterioration in accuracy of engagement with an externally toothed gear or assembling accuracy therewith.

With the foregoing in view, it is an object of the present invention to provide a strain wave gearing provided with an inner-race integrated-type internally toothed gear, which can suppress deformation in an internal-tooth forming portion due to fastening of bolts (screws).

Means of Solving the Problems

A strain wave gearing of a present invention is provided with: a rigid internally toothed gear; a flexible externally toothed gear; a wave generator that flexes the externally toothed gear in a non-circular shape to partially mesh with the internally toothed gear and moves an engagement position of the externally toothed gear with the internally toothed gear in a circumferential direction; and a bearing that supports the internally toothed gear and the externally toothed gear in a relatively rotatable state. The internally toothed gear is of an inner-race integrated-type gear, in which an inner race of the bearing is integrated with the internally toothed gear. The internally toothed gear is provided with a circular outer circumferential surface formed with an inner-race-side raceway groove of the bearing, a circular inner circumferential surface formed with internal teeth, and an annular end face where bolt holes are open. The bolt holes, which are arranged in a prescribed interval along the circumferential direction, extend in a direction of an axial line.

In the inner-race integrated-type internally toothed gear of the strain wave gearing of the present invention, the internal teeth thereof are located offset to a side of the annular end face with respect to the inner-race-side raceway groove when viewed along the direction of the axial line. Each of the bolt holes formed in the internally toothed gear includes a bolt passage hole part opening on the annular end face and a screw hole part that continues from the bolt passage hole and extends in the direction of the axis line. The screw hole part of each of the bolt holes is located offset to the opposite side of the annular end face with respect to the internal teeth when viewed in the direction of the axial line.

Effect of the Invention

According to the inner-race integrated-type internally toothed gear of the strain wave gearing of the present invention, the screw hole part, to which a bolt-fastening force (screw-fastening force) is applied, is formed at a location away in the direction of the axial line from a location adjacent to a radially outer side of the internal teeth. It is therefore possible to suppress adverse effects such as a decrease in the accuracy of engagement or assembling of the internally toothed gear and the externally toothed gear, the adverse effects being caused by the deformation occurring during fastening of a bolt (screw), at a portion in which the internal teeth are formed.

BRIEF DESCRIPTION OF THE DRAWINGS

FIG. 1(*a*) is a schematic longitudinal cross-sectional view showing an example of a strain wave gearing to which the present invention is applied, and FIG. 1(*b*) is a schematic end view thereof; and FIG. 2(*a*) is a schematic longitudinal cross-sectional view of an inner-race integrated-type internally toothed gear, and FIG. 2(*b*) is a schematic end view thereof.

MODE FOR CARRYING OUT THE INVENTION

An embodiment of a strain wave gearing to which the present invention has been applied is described below with reference to the drawings. The embodiment below shows one example of the present invention, there being no intention for the present invention to be limited to the present embodiment.

As shown in FIG. 1, a strain wave gearing 1 is provided with a rigid internally toothed gear 2, a flexible externally toothed gear 3 having a top-hat shape, a wave generator 4, and a bearing 5 that supports the internally toothed gear 2 and the externally toothed gear 3 in a relatively rotatable state. The wave generator 4 forms a state in which a portion where external teeth 30 of the externally toothed gear 3 are formed is made to flex in an elliptical shape and partially mesh with internal teeth 20 of the internally toothed gear 2. When the wave generator 4 is driven to rotate by a not-shown motor et.al, engagement positions of the externally toothed gear 3 with the internally toothed gear 2 move in the circumferential direction. A relative rotation between both gears 2 and 3 occurs in accordance with a difference in the number of teeth between the internally toothed gear 2 and the externally toothed gear 3. For example, the internally toothed gear 2 is fixed to a not-shown fixed-side member and is supported so as not to rotate, and the relative rotation is derived from the externally toothed gear 3 as a reduced-speed rotational output.

The bearing 5 is a crossed roller bearing in the present embodiment, and an outer race 6 thereof is fixedly fastened to an annular boss 31 of the externally toothed gear 3. An inner race of the bearing 5 is integrally formed on the internally toothed gear 2. In other words, the internally toothed gear 2 is an inner-race integrated-type internally toothed gear. The internally toothed gear 2 is provided with a circular outer circumferential surface 22 formed with an inner-race-side raceway groove 21 (V-shaped groove) of the bearing 5, a circular inner circumferential surface 24 formed with the internal teeth 20, a first annular end face 25 formed on one side in the direction of the axial line 1a and a second annular end face 26 formed on the other side in the direction of the axial line 1a. The internally toothed gear 2 is formed with bolt hoes 27, with which it is fixedly fastened to a not-shown fixed-side member.

The bolt holes 27 are arranged at an equiangular interval in the circumferential direction, open on the first annular end face 25, and extend from the first annular end face 25 in the direction of the axial line 1a. Each of the bolt holes 27 includes a bolt passage hole part 28 (drill hole part) opening on the first annular end face 25 and a screw hole part 29 that continues from the bolt passage hole 28 and extends in the direction of the axial line 1a. The bolt passage hole part 28 is a portion provided with a circular inner circumferential surface and the screw hole part 29 is a portion provided with screws on the circular inner circumferential surface.

Here, when viewed along the direction of the axial line 1a. the internal teeth 20 of the internally toothed gear 2 are formed on an inner circumferential surface portion of the circular inner circumferential surface 24, the inner circumferential surface portion being located at a side of the first annular end face 25. The inner-race-side raceway groove 21 is formed on an outer circumferential portion of the circular outer circumferential surface 22, the outer circumferential surface portion being located at a side of the second annular end face 26. In other words, the internal teeth 20 are formed at a location offset to a side of the first annular end face with respect to the inner-race-side raceway groove 21 when viewed in the direction of the axial line 1a.

In addition, the bolt passage hole part 28 of each of the bolt hole 27 is formed at a location radially outside of the internal teeth 20, and the screw hole part 29 thereof is formed at a location away from the internal teeth 20 in the direction of the axial line 1a. In other words, the screw hole part 29 of the bolt hole 27 is formed at a location offset to an opposite side of the first annular end face 25 with respect to the internal teeth 20 when viewed in the direction of the axial line 1a.

As explained above, in the inner-race integrated-type internally toothed gear 2, the screw hole part 29 of each of the bolt hole 27 is formed at a location offset in the direction of the axial line 1a from a portion where the internal teeth 20 are formed. The portion of the screw hole part 29 where a bolt-fastening force is applied when the internally toothed gear 2 is fixedly fastened to a not-shown fixed-side member, is offset in the direction of the axial line 1a from a location which is adjacent to the internal teeth 20 radially and outward. It is, therefore, possible to suppress or mitigate deformation that occurs during fastening of bolts in the portion where the internal teeth 20 of the internally toothed gear are formed. As a result, adverse effects caused by the deformation such as a decrease in the accuracy of engagement or assembling can be inhibited.

The invention claimed is:

1. A strain wave gearing comprising:
a rigid internally toothed gear;
a flexible externally toothed gear;
a wave generator that flexes the externally toothed gear in a non-circular shape to partially mesh with the internally toothed gear and moves an engagement position of the externally toothed gear with the internally toothed gear in a circumferential direction; and
a bearing that supports the internally toothed gear and the externally toothed gear in a relatively rotatable state,
wherein
the internally toothed gear is an inner-race integrated-type gear in which an inner race of the bearing is integrated with the internally toothed gear;
the internally toothed gear is provided with a circular outer circumferential surface formed with an inner-race-side raceway groove of the bearing, a circular inner circumferential surface formed with internal teeth, and an annular end face where bolt holes are open; and
the bolt holes are arranged in a prescribed interval along the circumferential direction and extend in a direction of an axial line, and
wherein
the internal teeth of the internally toothed gear are located offset to a side of the annular end face with respect to the inner-race-side raceway groove when viewed along the direction of the axial line;
each of the bolt holes is provided with a bolt passage hole part opening on the annular end face and a screw hole part that continues from the bolt passage hole and extends in the direction of the axis line; and
the entire screw hole part of each of the bolt holes is located offset to an opposite side of the annular end face with respect to the internal teeth when viewed in the direction of the axial line, so that the screw hole part has no overlapped section with the internal teeth in a radial direction.

* * * * *